United States Patent
Chen et al.

(10) Patent No.: US 11,150,854 B2
(45) Date of Patent: Oct. 19, 2021

(54) DISPLAY CONTROL METHOD, APPARATUS, AND ELECTRONIC DEVICE

(71) Applicant: Lenovo (Beijing) Co., Ltd., Beijing (CN)

(72) Inventors: Liang Chen, Beijing (CN); Yintian Liu, Beijing (CN)

(73) Assignee: LENOVO (BEIJING) CO., LTD., Beijing (CN)

(*) Notice: Subject to any disclaimer, the term of this patent is extended or adjusted under 35 U.S.C. 154(b) by 0 days.

(21) Appl. No.: 16/586,948

(22) Filed: Sep. 28, 2019

(65) Prior Publication Data
US 2020/0104089 A1 Apr. 2, 2020

(30) Foreign Application Priority Data
Sep. 30, 2018 (CN) .......................... 201811159265.0

(51) Int. Cl.
*G06F 3/14* (2006.01)
*G06F 3/0488* (2013.01)
(Continued)

(52) U.S. Cl.
CPC .......... *G06F 3/1423* (2013.01); *G06F 3/0412* (2013.01); *G06F 3/0484* (2013.01); *G06F 3/04812* (2013.01); *G06F 3/04886* (2013.01)

(58) Field of Classification Search
CPC ............... G06F 3/0482; G06F 3/04883; G06F 3/04842; G06F 3/0488; G06F 3/04886;
(Continued)

(56) References Cited

U.S. PATENT DOCUMENTS

2002/0191029 A1* 12/2002 Gillespie ............. G06F 3/04817
  715/810
2008/0111798 A1* 5/2008 Oveisi ................... G06F 1/1671
  345/179
(Continued)

FOREIGN PATENT DOCUMENTS

CN 105988758 A 10/2016
CN 106598520 A 4/2017
(Continued)

OTHER PUBLICATIONS

Netgear Support-"Defining the terms driver, firmware, hardware, software, and utility", Nov. 28, 2016 https://kb.netgear.com/1070/Defining-the-terms-driver-firmware-hardware-software-and-utility (Year: 2016).*

*Primary Examiner* — Dong Hui Liang
(74) *Attorney, Agent, or Firm* — Anova Law Group, PLLC

(57) ABSTRACT

Display control method, electronic device, and non-transitory computer-readable storage medium are provided. The display control method includes determining data to be displayed corresponding to an operating system of an electronic device; displaying a first portion of the data to be displayed in a first display device of the electronic device; and displaying a second portion of the data to be displayed in a second display device of the electronic device. The first portion is different from the second portion, and the first display device and the second display device perform display based on a same operating system of the electronic device.

20 Claims, 6 Drawing Sheets

---

Determining data to be displayed corresponding to an operating system of an electronic device — S101

Displaying a first portion of the data to be displayed in a first display device of the electronic device — S102

Displaying a second portion of the data to be displayed in a second display device of the electronic device, the first portion being different from the second portion — S103

(51) Int. Cl.
*G06F 3/0481* (2013.01)
*G06F 3/0484* (2013.01)
*G06F 3/041* (2006.01)

(58) Field of Classification Search
CPC .............. G06F 3/04817; G06F 3/0412; G06F 3/03547; G06F 1/1616; G06F 1/1626; G06F 2203/04803
See application file for complete search history.

(56) References Cited

U.S. PATENT DOCUMENTS

| | | | | |
|---|---|---|---|---|
| 2014/0325432 | A1* | 10/2014 | Frederickson | G06F 9/451 |
| | | | | 715/788 |
| 2015/0074564 | A1* | 3/2015 | Proctor | G06F 3/04812 |
| | | | | 715/761 |
| 2015/0286359 | A1* | 10/2015 | Oakley | G06F 1/1643 |
| | | | | 345/173 |
| 2019/0361543 | A1* | 11/2019 | Zhang | G06F 1/1684 |

FOREIGN PATENT DOCUMENTS

| | | |
|---|---|---|
| CN | 107357415 A | 11/2017 |
| CN | 108062146 A | 5/2018 |

\* cited by examiner

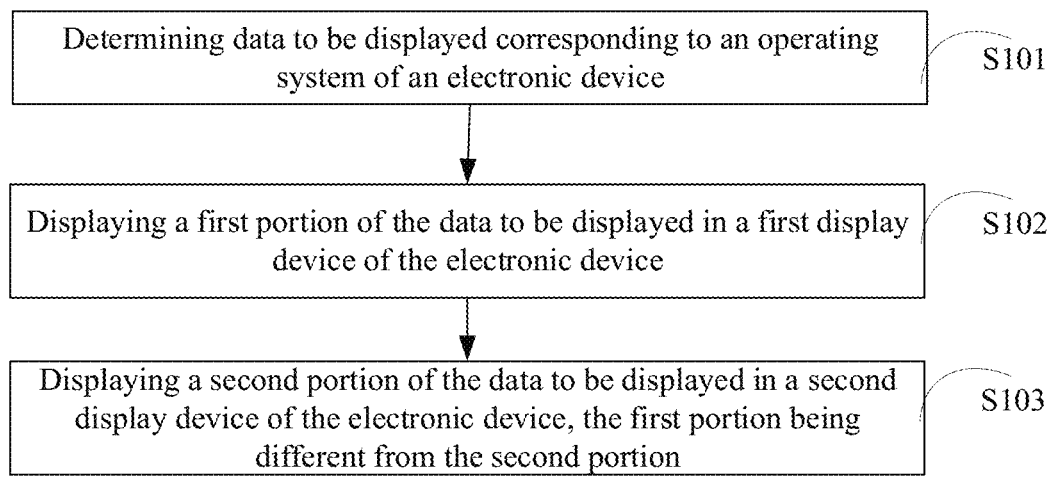
FIG. 1
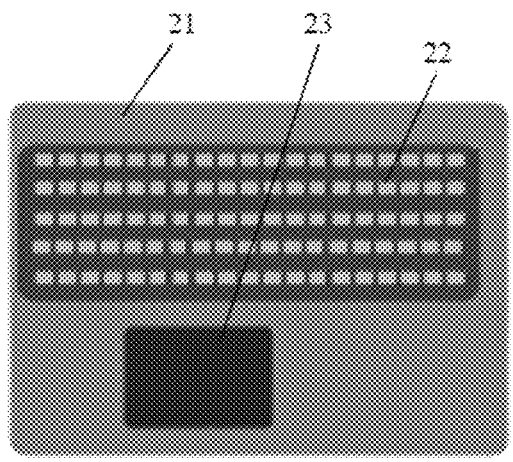
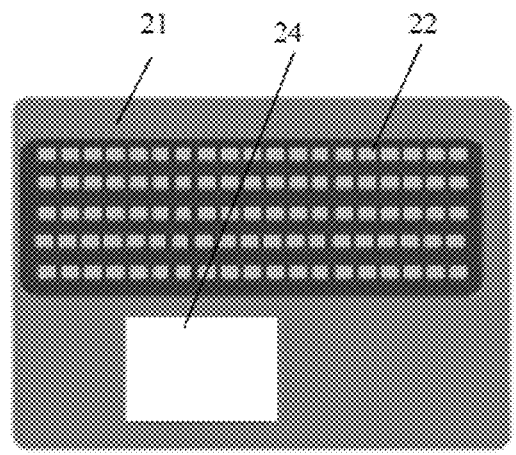
FIG. 2A　　　　　　　　FIG. 2B

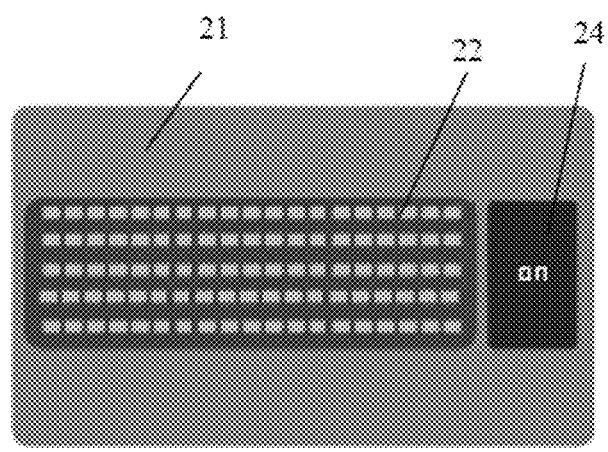
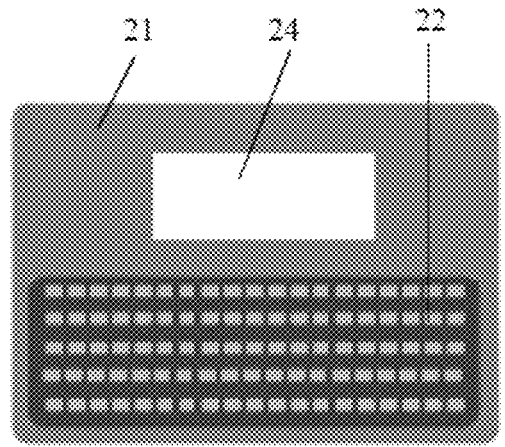
FIG. 3A                FIG. 3B
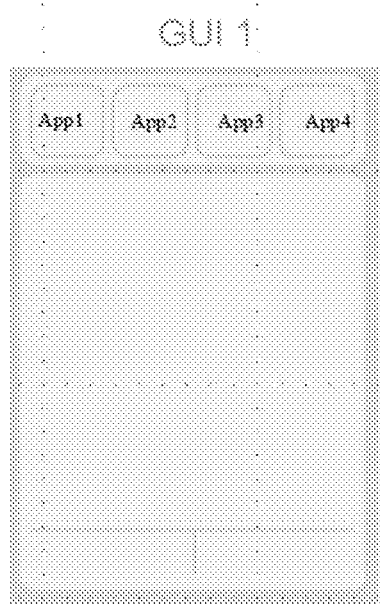
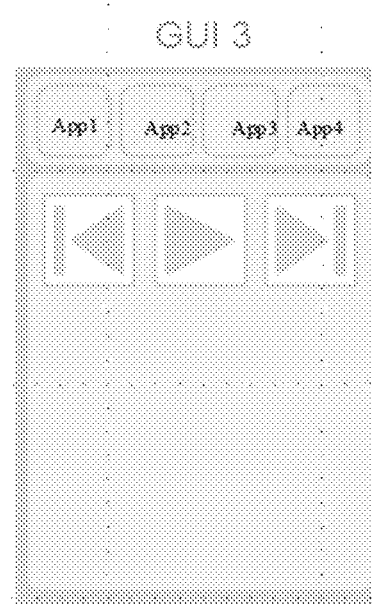
FIG. 4A                FIG. 4B                FIG. 4C

DISPLAY CONTROL METHOD, APPARATUS, AND ELECTRONIC DEVICE

CROSS-REFERENCE TO RELATED APPLICATIONS

This application claims priority to Chinese Patent Application No. 201811159265.0, filed on Sep. 30, 2018, the entire content of which is incorporated herein by reference.

FIELD OF TECHNOLOGY

The present disclosure relates to the field of electronic technology, and more specifically, to a display control method, an apparatus, and an electronic device.

BACKGROUND

Dual-screen has been the focus in the development of electronic devices in recent years. Many operating systems installed on the electronic devices have a single focus, and the switching of a cursor may be difficult when a single-focus system includes multiple screens or multiple windows. In order to improve the cursor switching process for a single-focus system, an independent advanced reduced-instruction-set-computing machine (ARM) system is used on one of the dual screens of the electronic device, while in hardware, a separate processor is required for the use of an ARM-based system. This increases the cost. In addition, such electronic device may take up more space.

The present disclosure provides a display control system, apparatus and electronic device, to allow a same system to be shared by dual screens of an electronic device with different data displayed on different display screens.

BRIEF SUMMARY OF THE DISCLOSURE

A display control method is provided according to some embodiments of the present disclosure. The display control method includes determining data to be displayed corresponding to an operating system of an electronic device; displaying a first portion of the data to be displayed in a first display device of the electronic device; and displaying a second portion of the data to be displayed in a second display device of the electronic device. The first portion is different from the second portion, and the first display device and the second display device perform display based on a same operating system of the electronic device.

An electronic device is provided according to some embodiments of the present disclosure. A first display device is configured to display a first portion of data to be displayed corresponding to an operating system of the electronic device. A second display device is configured to display a second portion of the data to be displayed corresponding to the same operating system of the electronic device. A processor is configured to: determine the data to be displayed corresponding to the operating system of the electronic device; display the first portion of the data to be displayed in the first display device of the electronic device; and display the second portion of the data to be displayed in the second display device of the electronic device. The first portion is different from the second portion.

A non-transitory computer-readable storage medium, containing program codes for, when executed by a processor, performing a display control method. The display control method includes determining data to be displayed corresponding to an operating system of an electronic device; displaying a first portion of the data to be displayed in a first display device of the electronic device; and displaying a second portion of the data to be displayed in a second display device of the electronic device. The first portion is different from the second portion, and the first display device and the second display device perform display based on a same operating system of the electronic device.

Other aspects or embodiments of the present disclosure can be understood by those skilled in the art in light of the description, the claims, and the drawings of the present disclosure.

BRIEF DESCRIPTION OF THE DRAWINGS

To clearly understand the present disclosure and advantages thereof, the present disclosure is described below with reference to the accompany drawings, in which:

FIG. 1 is a diagram illustrating a display control method according to some embodiments of the present disclosure;

FIGS. 2A-2B illustrate a comparison of a C-side of a conventional laptop with an example of a disclosed laptop according to some embodiments of the present disclosure;

FIGS. 3A-3B illustrate examples of C-sides of laptops according to some embodiments of the present disclosure;

FIGS. 4A-4C illustrate function display diagrams of a touch screen when the touch screen is used as a second display device according to some embodiments of the present disclosure;

DETAILED DESCRIPTION

Figure 5:
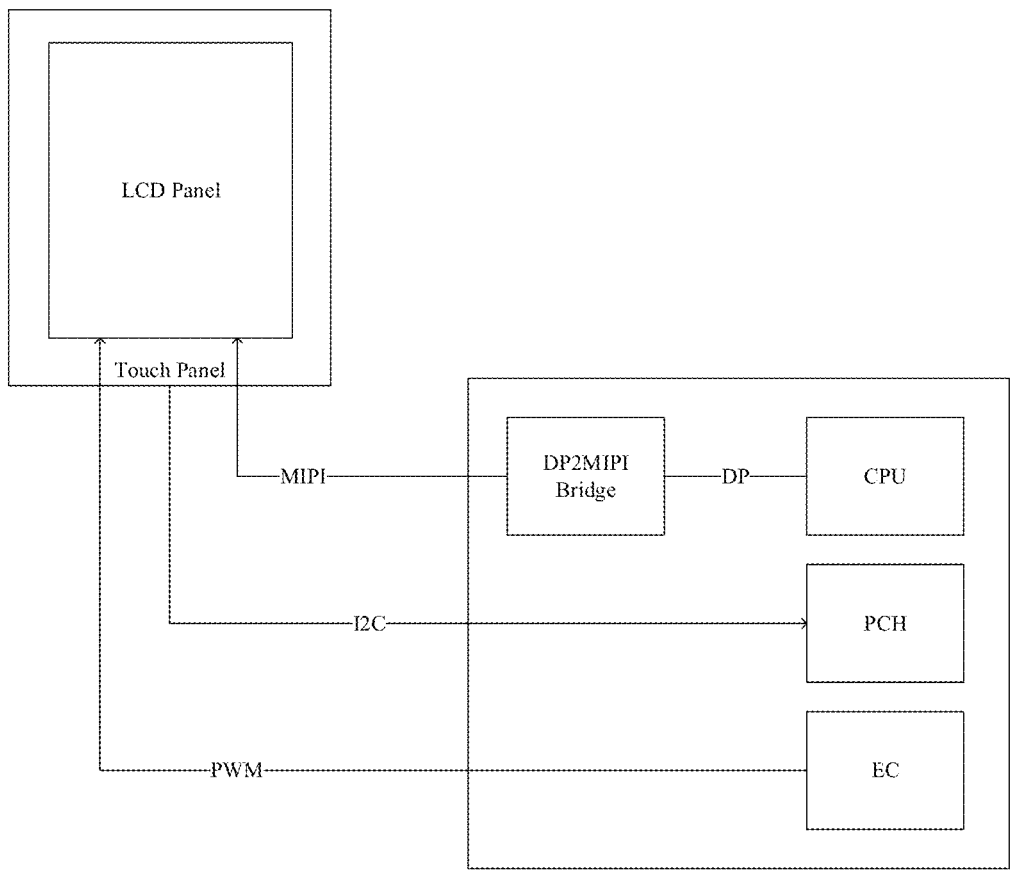
FIG. 5 is a connection structure diagram illustrating a touch screen used as a second display device and a second input device according to some embodiments of the present disclosure.

Dual-screen has been the focus in the development of electronic devices in recent years. Dual-screen has many advantages, for example, when a user is using a Personal Computer (PC) to write a document with Word at work, and a friend uses an instant messaging software to send a message to the user, when the PC does not have dual screens, the user may use one of following two methods to implement the operation process. Method 1, the user may open Word and the messaging window on the screen at the same time. As such, neither Word nor the messaging window can be in full-screen. The user may not need to switch windows when viewing the message sent by the friend, however, the viewing effect of a non-full-screen is generally not optimal. Method 2, the user may make one or more of the Word and the messaging window as full-screen. As such, when the user is viewing Word or the messaging window, the user may need to switch the window back and forth (or it may be understood as switching the cursor back and forth). When the PC has dual-screen, the user may display Word on a primary screen and the messaging window on a secondary screen, which will be very convenient as the user does not need to switch between windows and can use Word in full-screen without affecting the user experience.

Presently, many operating systems installed on the electronic devices have a single focus. For example, the widely installed Windows operating system on PC is a single-focus system. When there are multiple windows in the single-focus system, the cursor may switch with the current task. For example, when the user is using Word, the cursor will be in the Word document; and when the user wants to use instant message, the cursor will be in the messaging window. As such, it may be difficult to switch cursor when the single-focus system includes multiple screens or multiple windows. Conventionally, in order to improve the process of cursor switching for a single-focus system, an independent ARM system is generally used on one of the dual screens of the electronic device. However, from the perspective of hardware design, the use of an ARM-based system may increase the cost as the system needs a separate processor, and the size of the electronic device may also increase. The present disclosure provides a display control system such that different data may be displayed on different display screens for a dual-screen electronic device.

The technical solutions of the present disclosure will be described below in conjunction with the accompanying drawings and embodiments.

Embodiments of the present disclosure provide a display control method, for example, applied in an electronic device. The functions implemented by the method can be implemented by a processor in the electronic device executing program codes. As such, the program codes can be stored in a computer storage medium. That is, the electronic device includes at least the processor and the storage medium.

FIG. 1 is a diagram illustrating a display control method according to some embodiments of the present disclosure. The data processing method is described in more detail below.

S101, determining data to be displayed corresponding to an operating system of an electronic device.

The electronic device may include various types of devices with information processing capability during implementation. For example, the electronic device may be a mobile phone, a tablet, a desktop computer, a personal digital assistant, and the like.

In some embodiments, the operating system may be a single-focus system, such as a Window's operating system or any suitable operating system. The focus may be understood as an operation identifier such as a cursor, and the data to be displayed may be related to the user operation, current page, etc. On a desktop, when the user opens a Word document, the data to be displayed may include a display content of the Word document and an operation identifier. A blinking position of the cursor in Word may refer to the initial position of the cursor in the Word when the cursor returns to Word. Of course, the user may move the position of the cursor through an input device such as a mouse. When the cursor is moved to Word, the cursor may coincide with the blinking position of the cursor. Further, when the cursor is moved outside of Word, the blinking position of the cursor and the cursor may be two separately displayed symbols. The operation identifier in some embodiments may refer to a cursor, for example, it may fall within Word or it may fall outside of Word. When the user opens a game, the data to be displayed may include a loading interface and an operational identifier. When the user opens a window for instant messaging with a friend, the data to be displayed may include an interface content of the instant messaging window and an operation identifier.

S102, displaying a first portion of the data to be displayed in a first display device of the electronic device.

The electronic device may include a first display device and a second display device. The first display device may be considered to be a first display screen, and the second display device may be considered to be a second display screen. The first display screen and the second display screen may share the same single-focus operating system. The second display screen may serve as an extended screen of the first display screen, and the content (e.g., the first portion) displayed by the first display screen may be different from the content (e.g., the second portion) displayed on the second display screen. The first display screen may be used as a main display screen, the second display screen may be used as an extended screen of the first display screen, and the extended screen may cooperate with the main screen to display the data to be displayed. Using a laptop as an example. When the laptop is closed, the top side (e.g., the front side) with a logo may be an A side, and the other side facing the ground may be a D side. When the laptop is opened, the side with the display may be a B side, and the side with the keyword may be a C side. The display on the B side of the laptop may be used as the first display, and a display may be arranged on the C side of the laptop as the second display. A keyboard may be arranged on the C side, such that the display on the C side may be relatively small.

In some embodiments, a touch panel of the C side of a generic laptop may be changed to a touch screen, such that the touch screen of the C side may be used as the second display screen. Referring to FIGS. 2A-2B, FIG. 2A is a schematic view of a C side 21 of a conventional laptop. As shown in FIG. 2A, the C side 21 includes a keyboard area 22 and a touch panel area 23. FIG. 2B is a schematic view of an example of C side 21 of a laptop as disclosed in the present disclosure. As shown in FIG. 2B, the C side 21 includes a keyboard area 22 and a touch screen area 24. For example, the touch panel of the C side of the generic laptop may be changed to a touch screen, which may be used as a second display device (e.g., the second display screen).

In some embodiments as shown in FIG. 2B, the touch screen 24 is located below the keyboard area 22. That is, the touch screen is closer to the user than the keyboard, which, in some cases, is inconvenient for the user to look at the touch screen 24 as the second display device because the user has to look down. In other embodiments, the touch screen 24 may be arranged to be next to the keyboard area 22 as shown in FIG. 3A. In yet other embodiments, as shown in FIG. 3B, the touch screen 24 may be arranged to be above the keyboard area 22. That is, the touch screen is farther away from the user than the keyboard such that the user may view the touch screen easily.

S103, displaying a second portion of the data to be displayed in a second display device of the electronic device, where the first portion may be different from the second portion.

When the electronic device includes two display screens, the two display screens may display exactly the same content, especially for a single-focus operating system. In some embodiments, the laptop may be connected to an external monitor such that the display screen on the B side of the laptop and the external display may be exactly the same. When the two display screens are displaying exactly the same content, it is referred to as the clone mode. In some embodiments, the two display screens may not be based on the clone mode as the two display screens may display different contents (e.g., the first portion may be different from the second portion).

In some embodiments, the difference between the first portion and the second portion may be that the first portion may be content A plus content B, and the second portion may be content C plus content D. That is, the first portion may be completely different from the second portion. Of course, the first portion and the second portion may not be exactly the same, for example the first portion may be content A plus content B, and the second portion may be content A plus content C. Or, the first portion and the second portion of the desktop status bar (e.g., content A) may be the same, and the windows (e.g., content B or content C) may be different.

In some embodiments, the data to be displayed may include an operation identifier, and two adjacent portions of the data to be displayed may include a first portion and a second portion, respectively. In particular, the two adjacent portions may be logically adjacent. Since the resolution of the two screens may be different, the properties of the data of the first portion and the second portion, such as the resolution, may be different. When the resolution of the two screens are the same, the first portion and the second portion are logically adjacent, the data property, such as the resolution, may be the same.

The data to be displayed includes one operation identifier, and the operation identifier may be a positioning pointer that may be controlled by the input device. In some embodiments, the data to be displayed may include two operation identifiers. For example, one may be the cursor, and the other may be an input identifier.

In some embodiments, the first portion and the second portion may be directly displayed in the first display device and the second display device through a display interface instead of a cross-system conversion and transmission to display the same content as the first portion/second portion.

In some embodiments, the two adjacent portions may be that an image output by the operating system (OS) may be content A, which is divided into the adjacent content A1 plus content A2; or the image output by the OS may be content A plus content B, the first portion may include at least content A1, and the second portion may include at least content A2. For example, the first portion may be content A1 plus content B, and the second portion may be content A2 plus content B; the first portion may be content A1 plus content B, and the second portion may be content A2; or the first portion may be content A1, and the second portion may be content A2 plus content B, where content B may be a status bar or a desktop background.

Embodiments of the present disclosure provide a display control method, which may be applied in an electronic device. The functions implemented by the method can be implemented by a processor in the electronic device executing program codes. As such, the program codes can be stored in a computer storage medium. That is, the electronic device includes at least the processor and the storage medium.

The data processing method is described in more detail below.

S201, determining the data to be displayed corresponding to the operating system of the electronic device.

S202, displaying the first portion of the data to be displayed in the first display device of the electronic device.

S203, displaying the second portion of the data to be displayed in the first display device of the electronic device, where the first portion may be different from the second portion.

S204, acquiring trigger data from the second input device overlappingly configured with the second display device.

The second display device and the second input device may be implemented as a touch screen, such that the display function of the touch screen may be regarded as the second display device, and the touch function of the touch screen may be regarded as the second input device. As shown in FIG. 5, the touch panel is used as the second input device by a touch operation input method. As such, the touch panel may be connected to an I2C controller in a PCH through an I2C bus to collect the user's touch operations through the touch panel. The LCD panel may be used as the second display device, and the processor (CPU) may input the data to be displayed (e.g., the second portion) to the LCD panel through a DP bus, a DP2MIPI bridge (e.g., bridge), and a MIPI bus. Further, an EC chip of the electronic device may output some control information to the LCD panel to adjust the display parameters, such as the brightness of the LCD panel.

S205, triggering the function of the object at the position of the operation identifier based on the trigger data in response to the trigger data being used to trigger the function of the object at the position where the operation identifier may be located; triggering the function of the object at the position of the touch operation based on the trigger data in response to the trigger data being used to trigger the function of the object at the position of the touch operation; controlling the position of the operation identifier based on the trigger data in response to the trigger data being used to control the position of the operation identifier; or not controlling the position of the operation identifier based on the trigger data in response to the trigger data not being used to control the position of the operation identifier.

In some embodiments, the data to be displayed may include an operation identifier, and the two adjacent portions of the data to be displayed may be the first portion and the second portion, respectively.

The object at the position where the operation identifier may be located may refer to the display of the cursor on the second input device, which may be understood as a method the Window's operating system inputs the cursor by moving the mouse or the touch panel, or a cursor input method in a text box when text input in needed in the touch input mode of the touch screen. The object at the position where the operation identifier may be an object at the position of the cursor. For example, the cursor may be on a scroll bar of a news window, a scroll bar of a Word document window, or in a text box of a messaging window. Further, the cursor may also be on a linkable object, such that the function of the object at the position of the cursor may be triggered based on the trigger data. For example, when the cursor is on the scroll bar of the news window, the scroll bar may be dragged, and the content of the news window may change; or, when the cursor is on the linkable object, the URL that the object is linked to may be opened. As such, the trigger data may be used to control the position of the operation identifier, for example, as illustrated in FIG. 4A provided below in the present disclosure.

The object at the position where the touch operation may be located may refer to a manner in which the second input device performs input by touching an object at a position similar to that in the touch input mode of the touch screen. In some embodiments, the second display device may adopt the input mode of the touch screen. As such, the trigger data may not be used to control the position of the operation identifier, for example, as illustrated in FIGS. 4B-4C provided below in the present disclosure.

In some embodiments of the present disclosure, the electronic may include at least the first display device, second display device, and second input device. The electronic device may further include the first input device overlappingly configured with the first display device. That is, the first input device and the first display device may be implemented by using a touch screen during the implementation process. For the first portion displayed on the first display device, it may be implemented through the first input device, for example, by using a touch operation to cause the touch screen to sense. Of course, the electronic device may also include a conventional input device such as a mouse. When the user uses the mouse as the input device of the electronic device, the user may control the first portion, the second portion displayed on the second display device, and the first portion of the first display device and the second portion of the second display device. For laptops, the conventional input device may be the touch panel, which may be similar to a mouse. As such, when the user uses the touch panel as the input device of the electronic device, the user may control the first portion and/or the second portion.

In the following description, the electronic device will be described by using a laptop as an example, and the touch panel on a conventional laptop will be changed to a touch screen. That is, the laptop's touch panel includes a display function (e.g., as the second display device). Referring to Table 1, the touch screen (e.g., the second display screen) on the laptop may include the following use modes: a touch panel mode, an extended display mode, and an auxiliary display mode. In some embodiments, these use modes may be set by default or by the user.

(e.g., the touch screen may be used as a touch panel). As such, the touch screen (e.g., the second display screen) may not display any data to be displayed, or the touch screen may display the second portion of the data to be displayed. From a different perspective, the second portion may be considered to have no display data, that is, the second portion may be empty. In some embodiments, the display function of the touch screen (e.g., the second display screen) may be enabled, and the content displayed by the touch screen may not be directly related to the data to be displayed, as the touch screen may only display an image of the touch panel without displaying the operation identifier (e.g., the cursor). When the touch screen (e.g., the second display screen) is being used as a touch panel, all inputs may be responsive to the control of the cursor of the main screen (e.g., the first display device), which is a relative position input. That is, the touch area on the touch panel may be mapped to the first display screen. For example, the size of the first display screen may be 500*1000 distance units, the size of the touch screen (e.g., the second display screen) may be 100*200 distance units, and the relative position movement may be 5 times the coefficient. As such, when 10 distance units are moved on the touch screen (e.g., the second display screen), the operation identifier may move 50 distance units on the first display screen. That is, an area of 1*2 on the touch screen (e.g., the second display screen) may correspond to an area of 5*10 on the first display screen.

TABLE 1

Use Mode of the Touch Screen

|  | Display Function | Touch Function | Note |
| --- | --- | --- | --- |
| Touch panel Mode | May not display the content or display the image of the touch panel. The cursor of the OS may not be displayed here. | All inputs may respond to the control of the cursor of the main screen, and may be relative position inputs. |  |
| Extended Display Mode | As an extended display screen of the main screen, the cursor may be translated to this area and displayed here. | All inputs still control the cursor. The cursor may be controlled to move between the two screens, and may be a relative position input. |  |
| Auxiliary Display Mode | It is still an extended display screen, and specific implementation is that a specific application may take priority in exclusively using this display screen. The cursor may jump to here. | This is an input to the touch position of the smaller screen, which is an absolute position input. | When the touch input is used, the cursor may remain on the main screen; or when the text input is used, the cursor may jump to the extended screen. |

The main screen may be considered as the first display device, and the extended screen may be considered as the second display device. The "Auxiliary Display Mode" includes two sub-modes. The first sub-mode may be the touch input mode, in which the cursor may not jump to the extended screen. As such, the extended screen may not display the cursor. The second sub-mode may be that when there is text input, the cursor may jump to the extended screen, and the extended screen may also display the cursor. As can be seen from Table 1, the relationship between the first display screen and the second display screen may include the 3 modes in Table 1.

It should be noted that for the first mode (e.g., the touch panel mode), the display function of the touch screen may not be enabled, and only the touch function may be enabled For the second mode (e.g., the extended display mode), the touch screen (e.g., the second display screen) may simultaneously enable the display function and the touch function (e.g., the touch screen may be used as a touch panel and a display screen). As such, the touch screen (e.g., the second display screen) may display the second portion of the data to be displayed. When the touch screen (e.g., the second display screen) is being used as a touch panel, all inputs may respond to the control of the cursors of the main screen (e.g., the first display screen) and the extended screen (e.g., the second display screen), which are relative position inputs. That is, the operation identifier, such as the cursor, may be on the first display screen or on the second display screen. Further, the cursor may be switched from the first display screen to the second display screen, or from the second display screen to the first display screen. For example, when the data to be displayed includes a Word document and a messaging window, the user may display the Word document on the first display screen, and the messaging window on the second display screen. When the user is working in Word and someone sends a message to the user, and the user wishes to reply to the message, the cursor may be switched from the Word document to the messaging window. When the message is replied, the cursor may be switched back from the messaging window to the Word document such that the user may continue the work in Word. The user may complete the entire operation described above on the touch screen.

It should be noted that at this time, it may be necessary to establish an alignment of the operation identifier from the first display screen to the second display screen, and an alignment of the second display screen to the first display screen. For example, when the size of the first display screen is 500*1000 distance units and the size of the touch screen (e.g., the second display screen) is 100*200 distance units, when the upper right side of the first display screen is aligned, the cursor operated by the user may only enter the second display screen from 100 units of the upper right portion of the first display screen, or the cursor may enter the upper right portion of the first display screen from the second display screen. Further, when the lower left side of the first display screen is aligned, the cursor operated by the user may only enter the second display screen from 100 units of the lower left portion of the first display screen, or the cursor may enter the lower left portion of the first display screen from the second display screen. Of course, there may be an upper left alignment method and a lower right alignment method. However, these methods assume that one edge of the first display may be logically adjacent to an edge of the second display. That is, when the cursor is at the edge of the first display screen, and the cursor may enter the second display screen by moving the cursor. When the cursor is at the edge of the second display screen, moving the cursor may enter the edge of the first display, and there are many alignment methods for entering another screen. Of course, the mapping method may also be used. When the cursor controlled by the user is in a certain area of a display screen and the cursor moves again, the cursor may enter the corresponding area of the other display screen.

For the third mode (e.g., the auxiliary display mode), the touch screen (e.g., the second display screen) may be the extended screen of the first display screen, and the operation identifier may also appear on the second display screen. That is, the second display screen also be a blinking cursor. The operation identifier of the second display screen may be determined based on the absolute input position of the second display screen. When a touch operation, such as a slide operation, is displayed on the second display screen instead of a key, it may also be possible to determine the operation identifier. In the third mode, the input blinking cursor may appear only on the first display (as with the first mode), and of course, the input may be made at the touch position of the smaller screen, which is an absolute position input. When there is a touch input, the cursor may remain on the first display screen; or when there is a text input, the cursor may jump to the second display screen. However, unlike the second mode, the input on the second display screen is no longer a relative position, but an absolute position. In some embodiments, for some specific applications, the display may take priority on the second display screen. In some embodiments, the input of the absolute position may be some operation keys, and when these operation keys are triggered, the operation identifiers corresponding to the operation keys may be input.

The second display device in the present disclosure may be implemented by using a touch screen. FIGS. 4A-4C illustrate function display diagrams of a touch screen when the touch screen is used as a second display device according to some embodiments of the present disclosure. As shown in FIGS. 4A-4C, the touch screen is divided into an upper portion and a lower portion. Four shortcut setting keys are displayed in the upper portion, which include App1, App2, App3, and App4, respectively, where each App may correspond to one function. Further, the lower portion is divided into function display diagrams of the touch screen. Some embodiments of the present disclosure are described by using App1, App2, and App3 as an example, where GUI1, GUI2, and GUI3 are interfaces when App1, App2, and App3 are activated, respectively. In some embodiments, App1 may represent the function of the touch panel. As such, the lower portion of GUI1 may be a touch panel, which may be considered as the GUI in the touch panel mode described in Table 1 above. App2 may represent the calculation function. As such, the lower portion of GUI2 may display a calculator, which may only be used to perform the addition and subtraction functions. Those skilled in the art will appreciate that the calculator may be any other types of calculators. App3 represent the functions of a music player's shortcut keys. As such, the lower portion of GUI3 may display 3 shortcut keys. A first shortcut key is a key for the previous song, a third shortcut key is a key for the next song, and a second shortcut key is a key to pause a song. GUI2 and GUI3 may be considered as the GUI in the first sub-mode of the auxiliary display mode described in Table 1 above. In the auxiliary display mode, the calculator of GUI2 and the music player of GUI3 may take priority in displaying in the second display device. Since the keys on the calculator and the music player are touch inputs, under GUI2 and GUI3, the cursor may remain on the main screen (e.g., the first display screen).

Assuming App4 represents an instant messaging application, the lower portion of GUI4 may display the messaging window. In the messaging window in GUI4, when the user needs to input text, the cursor may also jump to the second display device. As such, the GUI4 may be considered as the GUI in the second sub-mode of the auxiliary display mode described in Table 1 above.

Embodiments of the present disclosure provide a display control method, which may be applied in an electronic device. The functions implemented by the method can be implemented by a processor in the electronic device executing program codes. As such, the program codes can be stored in a computer storage medium. That is, the electronic device includes at least the processor and the storage medium.

The data processing method is described in more detail below.

S301, determining the data to be displayed corresponding to the operating system of the electronic device.

S302, displaying the first portion of the data to be displayed in the first display device of the electronic device.

S303, displaying the second portion of the data to be displayed in the first display device of the electronic device, where the first portion may be different from the second portion.

In some embodiments, the display screen on the B side may be the first display screen (e.g., the main screen) of the electronic device, and the display screen on the C side may be the second display screen (e.g., the extended screen) of the electronic device.

In some embodiments, the data to be displayed may include an operation identifier, and the two adjacent portions of the data to be displayed may be the first portion and the second portion, respectively.

S304, acquiring trigger data from a second input device overlappingly configured with the second display device.

S305, controlling the operation cursor to be displayed on the first display screen based on the trigger in response to the trigger data is from an input device corresponding to the first display screen.

The input device of the first display screen may include several use cases.

Use case 1, which may be the first mode mentioned above. That is, the second display screen (e.g., the extended screen or the smaller screen) may only be used as the touch panel, and when the second display screen receives a touch. The focus on the first display screen may be unique, such that the operation cursor is only displayed on the first display screen based on the trigger data.

Use case 2, the first display screen (e.g., the main screen) itself may be a touch screen. When a touch is received, the focus on the first display screen may also be unique, such that the operation cursor is only displayed on the first display screen based on the trigger data.

Use case 3, the mouse of the electronic device may be an input device of the first display screen. As such, the operation cursor may only be displayed on the first display screen based on the trigger data.

Use case 4, which may be the second mode mentioned above. That is, the second display screen may be both a touch panel and a display screen, and the cursor may be switched from the first display screen to the second display screen, and then from the second display screen to the first display screen. As such, the operation cursor may be displayed on the first display screen based on the trigger data.

In short, the input device corresponding to the first display screen may include the second display screen as a touch panel of the first display screen, the first display screen as a touch screen, and the mouse corresponding to the first display screen.

S306, controlling the operation cursor to be displayed on the second display device based on the trigger data in response to the trigger data is from an input device corresponding to the second display screen.

The input device of the second display screen is described in the second mode mentioned above. That is, the touch function of the second display screen may be used as the input device for the display function of the second display screen. As such, when the user performs a sliding operation, the operation cursor may be displayed on the second display screen based on the trigger data.

Embodiments of the present disclosure provide a display control method, which may be applied in an electronic device. The functions implemented by the method can be implemented by a processor in the electronic device executing program codes. As such, the program codes can be stored in a computer storage medium. That is, the electronic device includes at least the processor and the storage medium.

The data processing method is described in more detail below.

S401, determining the data to be displayed corresponding to the operating system of the electronic device.

S402, displaying the first portion of the data to be displayed in the first display device of the electronic device.

S403, displaying the second portion of the data to be displayed in the first display device of the electronic device, where the first portion may be different from the second portion.

S404, acquiring trigger data from a second input device overlappingly configured with the second display device.

The second display device and the second input device may be arranged to be touch screen during implementation. As such, the display function of the touch screen may be used as the second display device, and the touch function of the touch screen may be used as the second input device.

S405, triggering the function of the object at the position of the operation identifier based on the trigger data in response to mode information of the second input device satisfying a first condition and the trigger data being used to trigger the function of the object at the position of the operation identifier; or controlling the position of the operation identifier based on the trigger data, where the trigger data may be used to control the position of the operation identifier.

The first condition may be a condition of the relative position input.

Further, triggering the function of the object at the position of the touch operation based on the trigger in response to the mode information of the second input device satisfying a second condition data, or not controlling the position of the operation identifier based on the trigger data, where the trigger data may be used to not control the position of the operation identifier.

The second condition may be a condition of the absolute position input.

In some embodiments, when the mode information of the second input device satisfies the first condition, the trigger data may be used to trigger the function of the object at the position of the operation identifier, or the trigger data may be used to control the position of the operation identifier. Further, when the mode information of the second input device satisfies the second condition, the trigger data may be used to trigger the function of the object at the position of the touch operation, or the trigger data may be used to not control the position of the operation identifier.

In some embodiments, the mode information of the second display input device may include whether a use mode of the second display device including a touch function is a first use mode or a second use mode.

In some embodiments, the first use mode may be a mode in which a part or all of the second display device including the touch function may be used as an input device corresponding to the function of the object at the position of the operation cursor and display the object at the position of the operation cursor. The second use mode may be a mode in which a part or all of the second display device including the touch function may be used as an input device corresponding to the object at the position of the touch operation and display the object at the position of the touch operation.

Correspondingly, the first condition may be that the use mode is the first use mode, and the second condition may be that the use mode is the second use mode.

Embodiments of the present disclosure provide a display control method, which may be applied in an electronic device. The functions implemented by the method can be implemented by a processor in the electronic device executing program codes. As such, the program codes can be stored in a computer storage medium. That is, the electronic device includes at least the processor and the storage medium.

The data processing method is described in more detail below.

S501, an application determines the data to be displayed corresponding to the operating system of the electronic device.

S502, the application displays the first portion of the data to be displayed in the first display device of the electronic device.

S503, the application displays the second portion of the data to be displayed in the first display device of the electronic device, where the first portion may be different from the second portion.

S504, the operating system acquires trigger data from a second input device overlappingly configured with the second display device.

The electronic device may include a firmware, the operating system, and an application. The firmware may be configured to acquire the trigger data from the second display device.

S505, the operating system transmits the trigger data to the application.

S506, the application determines whether the use mode of the second display device including a touch function may be the first use mode or the second use mode.

In some embodiments, the first use mode is a mode in which a part or all of the second display device including the touch function may be used as an input device corresponding to the function of the object at the position of the operation cursor and display the object at the position of the operation cursor. The second use mode is a mode in which a part or all of the second display device including the touch function may be used as an input device corresponding to the object at the position of the touch operation and display the object at the position of the touch operation.

S507, the application triggers the function of the object at the position of the operation identifier based on the trigger data or the application controls the position of the operation identifier based on the trigger data in response to the use mode of the second display device including the touch function being the first use mode.

S508, the application triggers the function of the object at the position of the touch operation based on the trigger data or the application does not control the position of the operation identifier based on the trigger data in response to the use mode of the second display device including the touch function being the second use mode.

Embodiments of the present disclosure provide a display control method, which may be applied in an electronic device. The functions implemented by the method can be implemented by a processor in the electronic device executing program codes. As such, the program codes can be stored in a computer storage medium. That is, the electronic device includes at least the processor and the storage medium.

The data processing method is described in more detail below.

S601, determining the data to be displayed corresponding to the operating system of the electronic device.

S602, displaying the first portion of the data to be displayed in the first display device of the electronic device.

S603, displaying the second portion of the data to be displayed in the first display device of the electronic device, where the first portion may be different from the second portion.

S604, acquiring trigger data from a second input device overlappingly configured with the second display device.

S605, controlling the function of the position of the operation identifier on the first portion or the second portion or controlling the function of the position of the operation identifier on the data to be displayed based on the trigger data in response to the mode information of the second input device satisfying the a third condition.

The trigger data may only be used to control the function of the position of the operation identifier on the first portion or the second portion, or the trigger data may be used to control the function of the position of the operation identifier on the data to be displayed. The third condition may be that the mode information of the second input device is a third use mode. In some embodiments, the third use mode may be a mode in which a part or all of the second display device including the touch function may be used as an input device corresponding to the function of the object in the position of the operation cursor in the first portion, and is not used to displayed the second portion.

In some embodiments, the third condition may be that the second display screen only include the function of the touch panel and the operation area of the touch panel may not be used for display, or only display an image of the touch panel. That is, the third condition may be understood as the first mode (the touch panel mode) in Table 1. In some embodiments, the second display screen may also be divided into two areas. A first area of the second display screen may adopt the touch panel mode, and a second area of the second display screen may be used as the display screen. Different from Table 1, the touch panel in the first mode may be used to control the operation identifier of the first portion of the first display screen. In some embodiments, the first are of the second display screen may be used to control the operation identifier of the second portion of the second area. In some embodiments, the user may freely divide the second display screen. That is, the user may designate the size of the first area and the second area. As such, the relationship between the first area and the second area may also include the 3 modes in Table 1.

In some embodiments, under the third condition, the second portion of the second display screen may be empty. That is, the second display device may not display the data of the touch panel image. Further, the second portion of the second display screen may not be empty. That is, the second display device may include data for displaying the touch panel image. In some embodiments, output data located outside of the operation identifier of the second portion that may or may not display the image of the touch panel may only be used to control the touch panel. That is, under the touch mode, the second portion may be divided into two pieces of data, one piece of data may be used to control the touch panel, and the other piece of data may be the content to be displayed by the touch panel.

Figure 6:
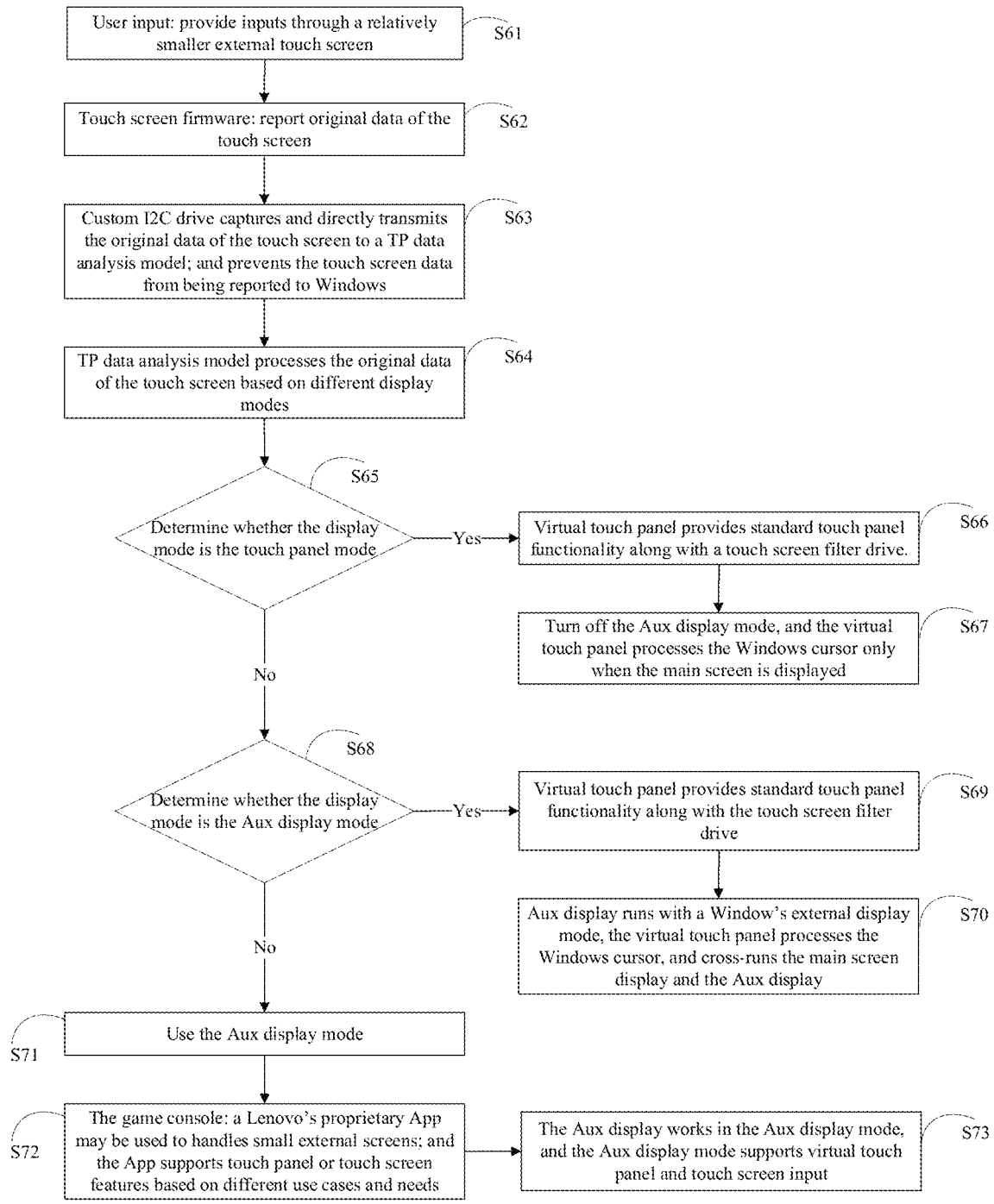
FIG. 6 is a flowchart illustrating a display control method according to some embodiments of the present disclosure.
Figure 7:
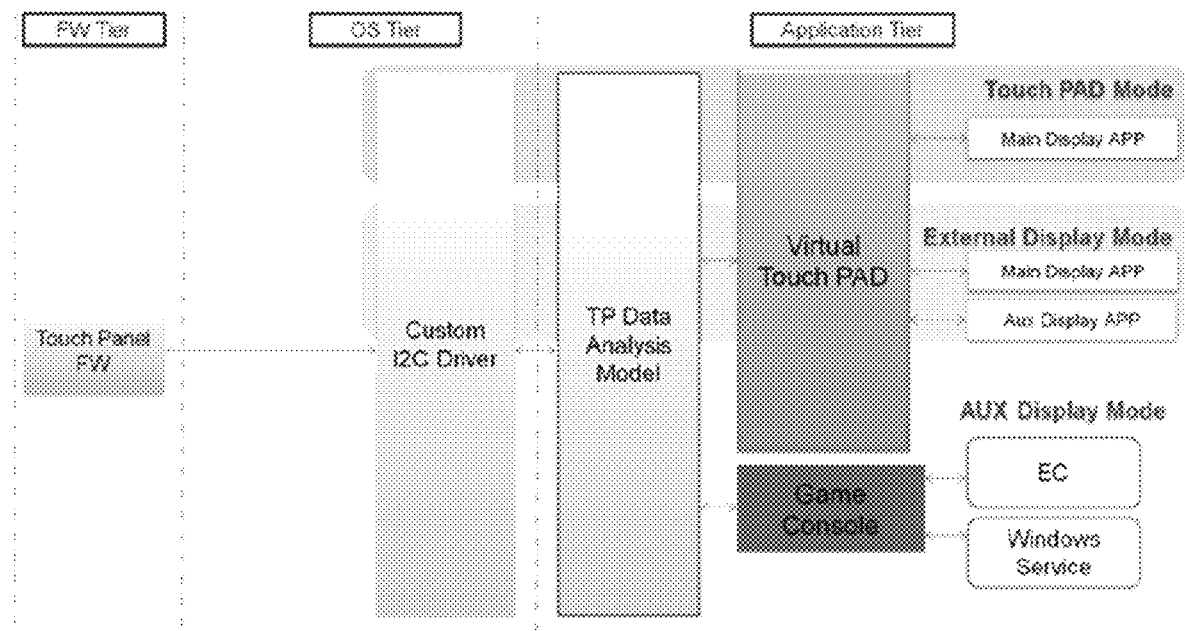
FIG. 7 is a diagram illustrating a software architecture according to some embodiments of the present disclosure.

FIG. 6 is a flowchart illustrating an implementation process of the display control method according to some embodiments of the present disclosure, and FIG. 7 is a diagram illustrating a software architecture according to some embodiments of the present disclosure. In conjunction with FIG. 6 and FIG. 7, a FW touch screen is included in a Firmware Tier (FW Tier). An Operating System Tier (OS Tier) includes a custom I2C driver, and an application tier includes a virtual touch panel and a game console. The game console may interface with an EC chip and a Windows Service, and this display mode may be referred to as an Aux display mode, which is the third mode in Table 1. The virtual touch pad may interact with a main display application, and this display mode may be referred to as a touch pad mode, which is the first mode in Table 1. Further, the virtual touch pad may interact with the main display application and an Aux display application, and this display mode may be referred to as an extended display mode, which is the second mode in Table 1.

The data processing method is described in more detail below.

S61, user input: provide inputs through a relatively smaller external touch screen.

S62, touch screen firmware: report original data of the touch screen.

S63, the custom I2C drive captures and directly transmits the original data of the touch screen to a TP data analysis model; and prevents the touch screen data from being reported to Windows.

S64, the TP data analysis model processes the original data of the touch screen based on different display modes.

S65, determine whether the display mode is the touch panel mode. If yes, proceed to S66, otherwise proceed to S68.

S66, the virtual touch panel provides standard touch panel functionality along with a touch screen filter drive.

S67, turn off the Aux display mode, and the virtual touch panel processes the Windows cursor only when the main screen is displayed.

S68, determine whether the display mode is the Aux display mode. If yes, proceed to S69, otherwise proceed to S71.

S69, the virtual touch panel provides standard touch panel functionality along with the touch screen filter drive.

S70, Aux display runs with a Window's external display mode, the virtual touch panel processes the Windows cursor, and cross-runs the main screen display and the Aux display.

S71, use the Aux display mode.

S72, the game console: a Lenovo's proprietary App may be used to handles small external screens; and the App supports touch panel or touch screen features based on different use cases and needs.

S73, the Aux display works in the Aux display mode, and the Aux display mode supports virtual touch panel and touch screen input.

The units in the display control apparatus provided in the present disclosure, and each module in the units may be implemented by a processor in the electronic device or a specific logic circuit. In some embodiments, the processor may be a Central Processing Unit (CPU), a microprocessor (MPU), a Digital Signal Processor (DSP), or a Field Programmable Gate Array (FPGA).

Figure 8:
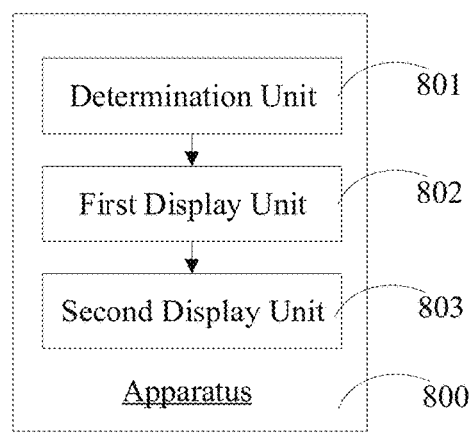
FIG. 8 is a structural diagram of a display control apparatus according to some embodiments of the present disclosure.

FIG. 8 is a structural diagram of a display control apparatus according to some embodiments of the present disclosure. As shown in FIG. 8, the display control apparatus 800 includes a determination unit 801, a first display unit 802, and a second display unit 803. The determination unit 801 may be configured to determine the data to be displayed corresponding to the operating system of the electronic device; the first display unit 802 may be configured to display a first portion of the data to be displayed in the first display device of the electronic device; and the second display unit 803 may be configured to display a second portion of the data to be displayed in the second display device of the electronic device, where the first portion may be different from the second portion.

In some embodiments, the data to be displayed may include an operation identifier, and two adjacent portions of the data to be displayed may be the first portion and the second portion, respectively.

In some embodiments, the display control apparatus may further include an acquisition unit and a triggering unit. The acquisition unit may be configured to acquire trigger data from a second input device overlappingly configured with the second display device. The triggering unit may be configured to trigger the function of the object at the position of the operation identifier based on the trigger data in response to the trigger data being used to trigger the function of the object at the position where the operation identifier may be located; or trigger the function of the object at the position of the touch operation based on the trigger data in response to the trigger data being used to trigger the function of the object at the position of the touch operation. Further, the triggering unit may be configured to control the position of the operation identifier based on the trigger data in response to the trigger data being used to control the position of the operation identifier; or not control the position of the operation identifier based on the trigger data in response to the trigger data not being used to control the position of the operation identifier.

In some embodiments, when the mode information of the second input device satisfies the first condition, the trigger data may be used to trigger the function of the object at the position of the operation identifier, or the trigger data may be used to control the position of the operation identifier.

In some embodiments, when the mode information of the second input device satisfies the second condition, the trigger data may be used to trigger the function of the object at the position of the touch operation, or the trigger data may be used to not control the position of the operation identifier.

In some embodiments, when the mode information of the second input device satisfies the third condition, the trigger data may only be used to control the function of the position of the operation identifier on the first portion or the second portion, or the trigger data may be used to control the function of the position of the operation identifier on the data to be displayed.

In some embodiments, the display control apparatus may further include a display unit. The display unit may be configured to control the operation cursor may be displayed on the first display device or the second display device based on the trigger data in response to the trigger data being received from the input device corresponding to the first display device; and controlling the operation cursor to be displayed on the second display device based on the trigger data in response to the trigger data being received the input device corresponding to the first display device.

In some embodiments, the mode information of the second display input device may include whether a use mode of the second display device including a touch function is a first use mode or a second use mode.

In some embodiments, the first use mode may be a mode in which a part or all of the second display device including the touch function may be used as an input device corresponding to the function of the object at the position of the operation cursor and display the object at the position of the operation cursor. The second use mode may be a mode in which a part or all of the second display device including the touch function may be used as an input device corresponding to the object at the position of the touch operation and display the object at the position of the touch operation.

Correspondingly, the first condition may be that the use mode is the first use mode, and the second condition may be that the use mode is the second use mode.

In some embodiments, the electronic device may include a firmware, an operating system, and an application. The firmware may be configured to acquire the trigger data from the second display device.

In some embodiments, the operating system may be used to transmit the trigger data to the application.

In some embodiments, the application may be configured to determine whether the use mode of the second display device including a touch function may be the first use mode or the second use mode.

In some embodiments, the application may trigger the function of the object at the position of the operation identifier based on the trigger data or the application may control the position of the operation identifier based on the trigger data in response to the use mode of the second display device including the touch function being the first use mode.

In some embodiments, the application may trigger the function of the object at the position of the touch operation based on the trigger data or the application may not control the position of the operation identifier based on the trigger data in response to the use mode of the second display device including the touch function being the second use mode.

The description of the display control apparatus embodiments mentioned above is similar to the description of the method embodiments mentioned above, and has similar advantageous effects as the method embodiments. For technical details not disclosed in the display control apparatus embodiments of the present disclosure, reference may be made to the description of the method embodiments of the present disclosure.

It should be noted that when the display control method mentioned above is implemented in a form of a software functional module and sold or used as an independent product, the functions may be stored in a computer-readable storage medium. Based on such an understanding, the technical solutions of the present disclosure essentially, or the part contributing to the prior art, or a part of the technical solutions may be implemented in a form of a software product. The computer software product is stored in a storage medium and includes several instructions for instructing an electronic device to perform all or a part of the steps of the methods described in the present disclosure. The foregoing storage medium includes: any medium that can store program code, such as a USB flash drive, a removable hard disk, a read-only memory (ROM), a random access memory (RAM), a magnetic disk, or an optical disc. As such, the embodiments of the present disclosure are not limited to any particular combination of hardware and software.

Correspondingly, the present disclosure provides an electronic device. The electronic device may include a first display device, a second display device, a memory, and a processor. The first display device may be configured to display a first portion of the data to be displayed corresponding to the operating system of the electronic device. The second display device may be configured to a second portion of the data to be displayed corresponding to the operating system of the electronic device. The memory may be used to store a computer program executable by the processor, and when the processor execute the computer program, the steps provided in the display control method in the previous embodiments may be implemented.

Correspondingly, embodiments of the present disclosure provide a computer readable storage medium for storing the computer program. When the computer program is executed by the processor, the steps provided in the display control method in the previous embodiments may be implemented.

It should be noted that the description of the storage medium and the electronic device embodiments mentioned above is similar to the description of the method embodiments mentioned above, and has similar advantageous effects as the method embodiments. For technical details not disclosed in the storage medium and electronic device embodiments of the present disclosure, reference may be made to the description of the method embodiments of the present disclosure.

Figure 9:
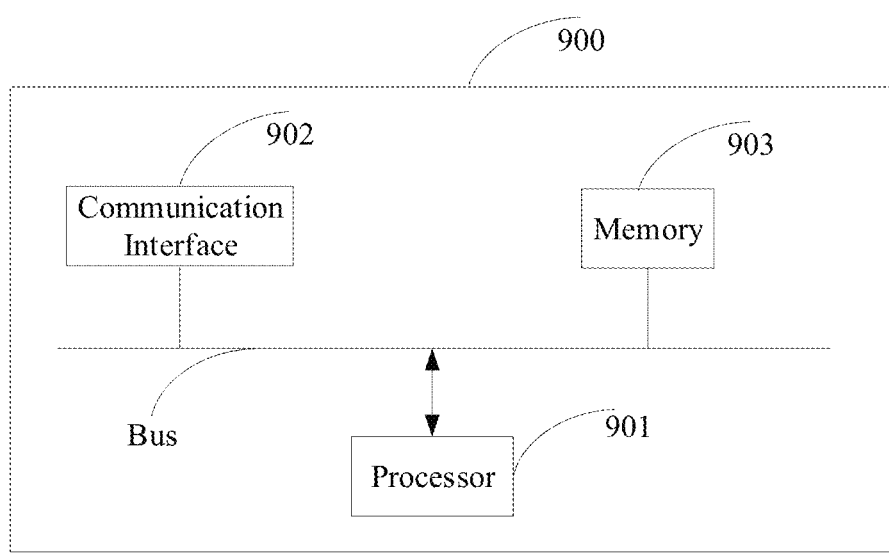
FIG. 9 is a hardware configuration diagram of an electronic device according to some embodiments of the present disclosure.

It should be noted that FIG. 9 is a hardware configuration diagram of an electronic device according to some embodiments of the present disclosure. As shown in FIG. 9, the hardware configuration of an electronic device 900 includes a processor, a communication interface 902, and a memory 903. The processor 901 may be used to control the overall operation of the electronic device 900, and the communication interface 902 may be used to establish a communication between the electronic device 900 and other terminals or servers over a network.

The memory 903 may be configured to store instructions and applications executable by the processor 901. Further, the memory 903 may also cache data to be processed or processed by the processor 901 and each module in the electronic device 900, and it may be implemented by a flash memory or a Random Access Memory (RAM).

In the several embodiments provided by the present disclosure, it should be understood that the disclosed system, apparatus, and method may be implemented in other manners. For example, the apparatus embodiments described above are merely illustrative. For example, the division of the units is only a logical function division. In actual implementation, there may be another division manner, for example, multiple units or components may be combined or integrated into another system. Some features can be omitted or not executed. In addition, the communication connection between the various parts shown or discussed may be implement through some interfaces. Further, an indirect connection or communication connection between devices or units may be electrical, mechanical or other types of connection.

The units described as separate components may or may not be physically separated, and the components displayed as units may or may not be physical units. That is, may be located in one place, or may be distributed to multiple network units. Some or all of the units may be selected according to actual needs to achieve the purpose of the solution of the embodiment.

Those skilled in the art should understand that, programs may instruct relevant hardware to execute all or a part of the steps of the processing method embodiments. The foregoing programs may be stored in a computer-readable storage medium. When the programs are executed, steps of the processing method described in the present disclosure may be executed. The storage medium includes: any medium that can store program code, such as a USB flash disk, a removable hard disk, a read-only memory (ROM), a random access memory (RAM), a magnetic disk, or an optical disc.

Alternatively, when the functions are implemented in a form of a software functional unit and sold or used as an independent product, the functions may be stored in a computer-readable storage medium. Based on such an understanding, the technical solutions of the present disclosure essentially, or the part contributing to the prior art, or a part of the technical solutions may be implemented in a form of a software product. The computer software product is stored in a storage medium and includes several instructions for instructing an electronic device to perform all or a part of the steps of the methods described in the present disclosure. The foregoing storage medium includes: any medium that can store program code, such as a USB flash drive, a removable hard disk, a read-only memory (ROM), a random access memory (RAM), a magnetic disk, or an optical disc.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. A display control method, comprising:
   determining data to be displayed corresponding to an operating system of an electronic device;
   displaying a first portion of the data to be displayed in a first display device of the electronic device; and
   displaying a second portion of the data to be displayed in a second display device of the electronic device, wherein: the first portion is different from the second portion, and the first display device and the second display device perform display based on a same operating system of the electronic device;
   in response to a first condition being satisfied, operating the second display device in a first use mode in which a part or all of the second display device is used as an input device corresponding to one or more functions of one or more objects at one or more positions of an operation cursor, and displaying the one or more objects at the corresponding one or more positions of the operation cursor, wherein the first condition is triggered by a relative position input;
   in response to a second condition being satisfied, operating the second display device in a second use mode in which a part or all of the second display device is used as an input device corresponding to one or more objects at one or more positions of a touch operation, and displaying the one or more objects at the corresponding one or more positions of the touch operation, wherein the second condition is triggered by an absolute position input; and
   in response to a third condition being satisfied, controlling, by a first area of the second device, an operation identifier of the second portion of the data in a second area of the second display device, wherein: the third condition is triggered by a complete touch panel mode, and the second display device includes the first area in a touch panel mode and the second area in a display mode, a size of the first area and a size of the second area being adjustable.

2. The method of claim 1, wherein the first portion of the data and the second portion of the data are two adjacent portions of the data to be displayed.

3. The method of claim 2, further comprising:
   acquiring trigger data from a part or all of the second display device that is used as the input device.

4. The method of claim 3, wherein:
   when mode information of the second input device satisfies the first condition, a position of the operation identifier is determined based on the trigger data; and
   when the mode information of the second input device satisfies the second condition, the position of the operation identifier is not determined based on the trigger data.

5. The method of claim 4, wherein the mode information of the second input device includes whether a use mode of the second display device including a touch function is the first use mode or the second use mode.

6. The method of claim 5, wherein the electronic device includes a firmware, the operating system, and an application, the firmware is configured to acquire the trigger data from the second display device;
   the operating system transmits the trigger data to the application;
   the application determines whether the use mode of the second display device including the touch function is the first use mode or the second use mode;
   in response to the use mode of the second display device including the touch function being the first use mode, the application triggers the function of the object at the position of the operation identifier based on the trigger data or the application controls the position of the operation identifier based on the trigger data; and
   in response to the use mode of the second display device including the touch function being the second use mode, the application triggers the function of the object at the position of the touch operation based on the trigger data or the application does not control the position of the operation identifier based on the trigger data.

7. The method of claim 3, wherein:
   when mode information of the second input device satisfies the third condition, only the function of the position of the operation identifier on the first portion or the second portion is implemented based on the trigger data, or, the function of the position of the operation identifier is implemented on the data to be displayed.

8. The method of claim 3, further comprising:
   in response to the trigger data being from an input device corresponding to the first display device, controlling an operation cursor to be displayed on the first display device based on the trigger data; and
   in response to the trigger data being from an input device corresponding to the second display device, controlling the operation cursor to be displayed on the second display device based on the trigger data.

9. An electronic device, comprising:
   a first display device configured to display a first portion of data to be displayed corresponding to an operating system of the electronic device;
   a second display device configured to display a second portion of the data to be displayed corresponding to the same operating system of the electronic device; and
   a processor configured to:
   determine the data to be displayed corresponding to the operating system of the electronic device;
   display the first portion of the data to be displayed in the first display device of the electronic device; and
   display the second portion of the data to be displayed in the second display device of the electronic device, wherein the first portion is different from the second portion;
   in response to a first condition being satisfied, operate the second display device in a first use mode in which a part or all of the second display device is used as an input device corresponding to one or more functions of one or more objects at one or more positions of an operation cursor, and display the one or more objects at the corresponding one or more positions of the operation cursor, wherein the first condition is triggered by a relative position input;

in response to a second condition being satisfied, operate the second display device in a second use mode in which a part or all of the second display device is used as an input device corresponding to one or more objects at one or more positions of a touch operation, and display the one or more objects at the corresponding one or more positions of the touch operation, wherein the second condition is triggered by an absolute position input; and in response to a third condition being satisfied, control a first area of the second device to operate an operation identifier of the second portion of the data in a second area of the second display device, wherein: the third condition is triggered by a complete touch panel mode, and the second display device includes the first area in a touch panel mode and the second area in a display mode, a size of the first area and a size of the second area being adjustable.

10. The electronic device of claim 9, wherein the first portion of the data and the second portion of the data are two adjacent portions of the data to be displayed.

11. The electronic device of claim 10, wherein the processor is further configured to:

acquire trigger data from a part or all of the second display device that is used as the input device.

12. The electronic device of claim 11, wherein when mode information of the second input device satisfies the first condition, a position of the operation identifier is determined based on the trigger data; and the mode information of the second input device satisfies the second condition, the position of the operation identifier is not determined based on the trigger data.

13. The electronic device of claim 11, wherein the processor is further configured to:

control only the function of the position of the operation identifier on the first portion or the second portion based on the trigger data or control the function of the position of the operation identifier on the data to be displayed based on the trigger data in response to the mode information of the second input device satisfying the third condition.

14. The electronic device of claim 11, wherein the processor is further configured to:

control an operation cursor to be displayed on the first display device based on the trigger data in response to the trigger data being from an input device corresponding to the first display device; and control the operation cursor to be displayed on the second display device based on the trigger data in response to the trigger data being from an input device corresponding to the second display device.

15. A non-transitory computer-readable storage medium, containing program codes for, when executed by a processor, performing a display control method comprising:

determining data to be displayed corresponding to an operating system of an electronic device;

displaying a first portion of the data to be displayed in a first display device of the electronic device; and displaying a second portion of the data to be displayed in a second display device of the electronic device, wherein: the first portion is different from the second portion, and the first display device and the second display device perform display based on a same operating system of the electronic device;

in response to a first condition being satisfied, operating the second display device in a first use mode in which a part or all of the second display device is used as an input device corresponding to one or more functions of one or more objects at one or more positions of an operation cursor, and displaying the one or more objects at the corresponding one or more positions of the operation cursor, wherein the first condition is triggered by a relative position input;

in response to a second condition being satisfied, operating the second display device in a second use mode in which a part or all of the second display device is used as an input device corresponding to one or more objects at one or more positions of a touch operation, and displaying the one or more objects at the corresponding one or more positions of the touch operation, wherein the second condition is triggered by an absolute position input; and in response to a third condition being satisfied, controlling, by a first area of the second device, an operation identifier of the second portion of the data in a second area of the second display device, wherein: the third condition is triggered by a complete touch panel mode, and the second display device includes the first area in a touch panel mode and the second area in a display mode, a size of the first area and a size of the second area being adjustable.

16. The storage medium of claim 15, wherein the first portion of the data and the second portion of the data are two adjacent portions of the data to be displayed.

17. The storage medium of claim 16, wherein the method further comprises:

acquiring trigger data from a part or all of the second display device that is used as the input device.

18. The storage medium of claim 17, wherein:

when mode information of the second input device satisfies the first condition, a position of the operation identifier is determined based on the trigger data; and when the mode information of the second input device satisfies the second condition, the position of the operation identifier is not determined based on the trigger data.

19. The storage medium of claim 17, wherein:

when mode information of the second input device satisfies the third condition, the trigger data is configured to control only the function of the position of the operation identifier on the first portion or the second portion, or to control the function of the position of the operation identifier on the data to be displayed.

20. The storage medium of claim 17, wherein the method further comprises:

in response to the trigger data being from an input device corresponding to the first display device, controlling an operation cursor to be displayed on the first display device based on the trigger data; and in response to the trigger data being from an input device corresponding to the second display device, controlling the operation cursor to be displayed on the second display device based on the trigger data.

* * * * *